Aug. 19, 1958

R. L. HIBBARD 2,847,711

METHOD OF TREATING POLYTETRAFLUOROETHYLENE
AND TO POLYTETRAFLUOROETHYLENE SO TREATED

Filed Aug. 10, 1954

INVENTOR.
ROBERT L. HIBBARD
BY
David D. McKenney

ATTORNEY

Aug. 19, 1958   R. L. HIBBARD   2,847,711
METHOD OF TREATING POLYTETRAFLUOROETHYLENE
AND TO POLYTETRAFLUOROETHYLENE SO TREATED
Filed Aug. 10, 1954   5 Sheets-Sheet 2

INVENTOR.
ROBERT L. HIBBARD
BY
*David D. McKenney*
ATTORNEY

Aug. 19, 1958 R. L. HIBBARD 2,847,711
METHOD OF TREATING POLYTETRAFLUOROETHYLENE
AND TO POLYTETRAFLUOROETHYLENE SO TREATED
Filed Aug. 10, 1954 5 Sheets-Sheet 3

INVENTOR.
ROBERT L. HIBBARD
BY
*David D. McKenney*
ATTORNEY

Aug. 19, 1958　　　R. L. HIBBARD　　　2,847,711
METHOD OF TREATING POLYTETRAFLUOROETHYLENE
AND TO POLYTETRAFLUOROETHYLENE SO TREATED
Filed Aug. 10, 1954　　　　　　　　　5 Sheets-Sheet 4

*INVENTOR.*
ROBERT L. HIBBARD
BY
*David D. McKenney*
ATTORNEY

Aug. 19, 1958 R. L. HIBBARD 2,847,711
METHOD OF TREATING POLYTETRAFLUOROETHYLENE
AND TO POLYTETRAFLUOROETHYLENE SO TREATED
Filed Aug. 10, 1954 5 Sheets-Sheet 5

INVENTOR.
ROBERT L. HIBBARD
BY
ATTORNEY

United States Patent Office 2,847,711
Patented Aug. 19, 1958

2,847,711

METHOD OF TREATING POLYTETRAFLUORO-ETHYLENE AND TO POLYTETRAFLUORO-ETHYLENE SO TREATED

Robert L. Hibbard, Hamden, Conn., assignor, by mesne assignments, to Grinnell Corporation, Providence, R. I., a corporation of Delaware Application August 10, 1954, Serial No. 448,965

16 Claims. (Cl. 18—55)

This invention relates to a method of treating polytetrafluoroethylene and to polytetrafluoroethylene so treated. It further relates to a method of so treating polytetrafluoroethylene and simultaneously forming the same into useful articles having improved properties. It further relates to the improved articles so formed.

The chemical inertness of polytetrafluoroethylene is well know, making this an attractive material from which to form parts which are exposed to corrosive fluids. Because of its relatively great flexibility as compared with some other inert materials, particular efforts have been made to form polytetrafluoroethylene into those articles which are intended to contact or contain, and flex in the presence of, these corrosive fluids. Examples of such articles are diaphragm valve diaphragms.

Heretofore these articles have been produced by a forming or molding operation in which the polytetrafluoroethylene is heated to a temperature above the second order transition temperature thereof and is then molded or formed.

The difficulty has been, however, that when such articles are prepared by the molding or forming methods heretofore known, failures in the form of ruptures, which appear at certain locations in the material and through which the corrosive fluids can pass, are found to occur after a relatively small number of flexures. Since such failures necessitate replacement and, more seriously, often involve shut-down of equipment during this replacement, early failure of the polytetrafluoroethylene article is expensive. Furthermore, the greater the frequency of failure the greater the chance of a failure going undetected with the result that parts and equipment not intended to withstand the leaking corrosive fluid may be ruined thereby.

One object of the present invention is to provide polytetrafluoroethylene articles, such as diaphragm valve diaphragms, which have a flex life (number of flexures before rupture) which on the average is five times greater than the flex life of corresponding polytetrafluoroethylene articles known heretofore.

Another object is to provide methods for producing such articles.

Another object is to provide a predetermined quantity of polytetrafluoroethylene having an unexpectedly higher degree of toughness, impenetrability and flexibility than have been achieved previously.

Another object is to provide methods for producing such predetermined quantity of polytetrafluoroethylene.

Yet another object is to provide improved polytetrafluoroethylene articles, such as diaphragm valve diaphragms, and methods for producing the same.

These objects are attained in accordance with the present invention by applying to a predetermined quantity of polytetrafluoroethylene, while the same is within a temperature range defined by the second order transition temperature of this material and a higher maximum temperature, super-atmospheric pressure at least until all portions of such quantity become transparent, but for an insufficient time to produce substantial decomposition of such quantity, and cooling such quantity through the transition temperature. Such superatmospheric pressure being insufficient to produce cracks in the hot quantity, and such maximum temperature being less than that temperature which produces substantial decomposition of the polytetrafluoroethylene during the period that it is within such temperature range.

By applying the pressure in a forming device, such as a mold, an article having any desired shape, as for example, a diaphragm valve diaphragm, and having the advantages set forth in the above objects may be produced.

Rapid cooling, for example shock cooling, produces much better results than slow cooling, and shock-cooling by compressing the hot polytetrafluoroethylene in a cold mold produces by far the best results.

Figure 1:
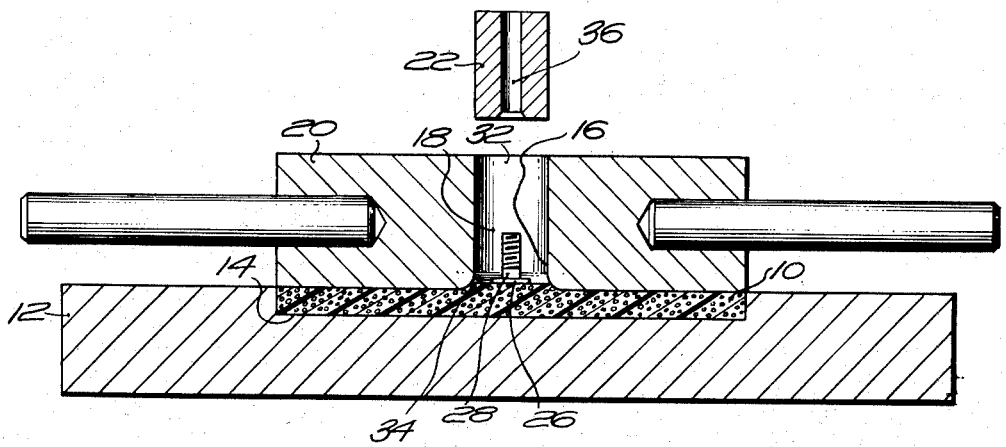
Figure 1 is a cross-section elevation view of the arrangement of the preform mold, polytetrafluoroethylene molding powder and stud at one stage in the method of simultaneously molding and treating polytetrafluoroethylene diaphragm valve diaphragms which is set forth in Example 1, this stage in the method being before completion of the loading of the preform mold.

The present invention has within its scope the method simply of treating a predetermined quantity of polytetrafluoroethylene which has been previously formed into a finished article by a procedure heretofore known and also has within its scope the method treating a predetermined quantity of this material simultaneously with the initial formation of it into a useful article from one of the commercially available solid forms. Considering the latter case first, polytetrafluoroethylene may be treated as contemplated by this invention while it is being molded into a desired shape. This material in any convenient solid form may be employed at the commencement of this combined treating and molding procedure, for example, in powdered, granular, sheet or bar form, depending to a large extent on which of these lends itself most readily to transformation into the article shape. It is preferred that the starting material, regardless of form, be substantially pure and that the sheet and bar forms be substantially free of cracks.

Commercial molding powder is one of the highly satisfactory forms of polytetrafluoroethylene with which to commence the practice of the present method of simultaneously treating and forming this material. Preferably this powder is first made into a preform piece by pressing a suitable quantity of the powder in a preform mold which has powder confining surfaces with the general configurations of the desired article. (In selecting the suitable quantity of this powder a "bulk factor" of approximately four-to-one should be taken into account, and in distributing the powder in the preform mold effort should be made to have this distribution correspond to the quantities required in the various portions of the desired finished article.) Preferably this preform molding is done at room temperature with preform molding pressure in the order of 1000 to 3000 pounds per square inch, gage. Under these conditions the powder is squeezed into a preform piece which is compact enough to withstand normal handling and which is white and opaque.

Next this preform piece is heated in an oven at atmospheric pressure to a temperature above the second order transition temperature of polytetrafluoroethylene. This second order transition temperature is approximately 620° F. at atmospheric pressure and increases with increases in pressure. During the heating of the preform piece the pressure thereon is preferably not increased above atmospheric, so that the second order transition temperature is reached at approximately 620° F. Preferably in the present method the preform piece is heated in the oven as described to a temperature in the neighborhood of 680° F.

When raised above the second order transition temperature the hot preform piece remains white and opaque and is not rendered transparent by merely maintaining the preform piece at the selected temperature for a prolonged period.

After the hot preform piece has remained at the selected temperature for a certain period (30 minutes is preferred for the temperature of 680° F.) the piece is removed from the oven and loaded into a second mold. This second mold has piece confining surfaces with the general configurations of the desired article and is itself maintained at a temperature above the second order transition temperature and preferably at approximately the temperature of the hot preform piece. Pressure is then applied to the piece in this second mold and maintained at least until the piece is both formed into the desired shape and all cloudy portions of the hot polytetrafluoroethylene have become transparent or, in other words, the hot polytetrafluoroethylene is uniformly transparent. Inasmuch as some forming of the piece into the desired shape is accomplished by the pressure employed in this step, this pressure should be at least that which produces sufficient force to exceed the yield point of the material in the hot piece. On the other hand the pressure in this step should be less than that which produces cracks in the hot piece or excessive flashing. An example of a preferred pressure for a hot piece temperature of 680° F. is 1000 pounds per square inch, gage. Transparency can be expected with this combination of temperature and pressure after about fifteen minutes where the mass is a small one, having a volume of only a few cubic inches and where the loading of the molding powder in the preform mold was done with reasonable care.

After transparency is achieved in every portion of the piece it may be removed from the second mold and cooled. Although unexpectedly high degrees of toughness, impenetrability and flexibility are noted in the finished piece when the cooling thereof is relatively slow, for example when the hot piece is merely exposed to air at room temperature, by far the best results are obtained by rapid cooling of the hot piece, for example, by that cooling which is known in the art as shock cooling. It is preferred that rapid cooling be employed and one very satisfactory procedure for accomplishing this is to suddenly press the hot piece in a cold mold having piece engaging surfaces with the configurations of the desired shape and having a temperature in the order of 0° F. It is preferred that the pressure exerted by the cold mold be in the order of 1500 pounds per square inch, gage.

It is one of the discoveries of the present invention that when a predetermined quantity of polytetrafluoroethylene is heated to a temperature above the second order transition temperature and superatmospheric pressure is applied to the hot quantity, the cloudiness which characterizes all or certain portions of the hot quantity for a time after such pressure application, is eventually transformed to transparency when the temperature and pressure selected are maintained for a certain time. And it is a further discovery that when every portion of the predetermined quantity is characterized by such complete transparency before the hot quantity is cooled, unexpectedly high degrees of flex life, toughness, impenetrability and flexibility are noticed in the quantity as a unit after cooling.

It is true that transparency has heretofore been achieved in random, intermittent portions of polytetrafluoroethylene articles subjected to heat and pressure, but it has been established that articles which are characterized only by such random transparency while subjected to heat and pressure are greatly inferior to those produced by the methods herein described. It is therefore understood that insofar as this invention pertains to the achievement of transparency it has to do with such achievement in every portion of the predetermined quantity being processed or with such achievement at least in those portions where the superior results are desired, inasmuch as these superior results which have been discovered are correlated with such complete or selective transparency.

It is a further discovery of the present invention that by far the best results are obtained when the predetermined quantity of polytetrafluoroethylene is rapidly cooled through the second order transition temperature of this material after the described transparency is achieved.

The variables involved in the practice of the methods contemplated by this invention are the loading of the initial mold, the initial molding pressure, the temperature to which the material is heated, the pressure which is exerted on the hot material, the time during which such pressure is maintained and the rate of cooling of the hot material.

With regard to the loading of the initial mold, as for example the loading of the preform mold with the molding powder, it has been discovered that the more carefully the charge is distributed to contain in each of its component parts an amount of material proportionate to the amount of material in the corresponding parts of the finished article the shorter the time which will later be required for a given pressure on the hot quantity at a given temperature to achieve the desired transparency in all portions of the charge in the second mold. In the method contemplated by this invention wherein a finished article is treated after first being formed by a method heretofore known, the finished article is merely heated and placed in the second mold for squeezing, but in this case, as well, the loading which is done in the practice of the known method will influence the time later required to achieve the transparency required in the practice of the present method. The loading contemplated by the present invention is that which may be termed "careful" by those skilled in this art.

With regard to initial molding pressure, as for example the squeezing of the molding powder to form a preform piece, the minimum pressure contemplated by this invention is that pressure which causes the powder particles to stick together and form a piece which will withstand normal handling when the piece is removed from the preform mold. The maximum initial molding pressure contemplated is a pressure just below that which produces cracks or slip faults. It is a known characteristic of polytetrafluoroethylene that when a quantity of this material is subjected to certain pressures cracks will occur within or at the surface of the quantity. These cracks may be seen by the unaided eye, often giving the mass a flaky appearance as distinguished from the opaque, cloudy and transparent appearances previously mentioned herein. Slip faults are lateral displacements of layers of the material relative to each other resulting in a separation of these layers. These separations can often be seen even when they are entirely within the preform piece. They are particularly apparent when they extend to the surface of the preform piece. In the method contemplated by this invention wherein an article is treated after first being finished by one of the earlier known methods the pressures employed in the practice of such known methods were satisfactory if the article is in fact properly formed and none of the described defects appear. As a practical matter the identification of those pressure values which begin to result in these described defects is not feasible because these pressures depend upon many factors including the care taken in the initial loading of the mold charge, the configuration of the article and, in the case where a finished article is merely treated by the present method, the temperature of the material when the pressure of the previously known method was applied. However, for any particular set of these conditions chosen the determination of the pressure which results in defects is simple, being a visual test and constituting a simple experiment for the skilled person. If in the preparation of a preform the opacity of the material should make it difficult to determine whether faults have resulted from a given preform pressure, continuation of the method as herein described until the article is finished and cooled and stressing the article (for example, by bending) at the doubtful area will enable any defects to be seen readily. Initial molding pressures which are suitable for use in molding the preform range from about 500 to 3500 pounds per square inch, gage, but pressures ranging from 1000 to 3000 pounds per square inch, gage, are preferred.

With regard to the temperature to which the predetermined quantity of polytetrafluoroethylene (either a preform or a finished article) is to be heated preparatory to the application of presssure in the second mold, the minimum temperature is the second order transition temperature of this material. At atmospheric pressure this transition temperature is approximately 620 F. As the pressure increases from atmospheric this transition temperature also increases. The maximum temperature contemplated is a temperature just below that temperature which results in substantial decomposition of the polytetrafluoroethylene. Decomposition results in the material being weak after it is cooled. Since it is true that the higher the temperature the greater the amount of decomposition for a given period during which such temperature is maintained, high temperatures, for example 850° F., can be maintained for only very short periods before substantial decomposition takes place. Furthermore the time involved in heating to and cooling from a given temperature must be considered because of the decomposition which occurs. At the second order transition temperature decomposition is sufficiently slow to readily permit the practice of the present invention before substantial decomposition takes place. Considering the time required to heat to and cool from high temperatures the temperature of 850° F. may be considered as maximum.

Inasmuch as this invention is directed toward a stronger polytetrafluoroethylene quantity than has been hitherto known and to methods of preparing the same, it will be appreciated that the described decomposition must not be permitted to offset the benefits of the invention. Accordingly, in considering 850° F. as a maximum temperature it will be understood that in achieving this temperature the temperature of the material should not remain above approximately 750° F. for more than several seconds in the practice of the methods.

In view of the molding techniques presently employed an economical maximum temperature is approximately 750° F. In achieving this economical temperature it is understood that the temperature of the material should not remain above approximately 700° F. for more than approximately ten minutes.

The maximum temperature which, with the second order transition temperature, defines the most preferred temperature range is approximately 700° F., and the maintenance of temperature within this range for up to approximately two hours is not found to result in appreciable decomposition.

With regard to the pressure which is exerted on the hot quantity of polytetrafluoroethylene in the second mold in the practice of the present methods, the minimum pressure is that which will exert force on the hot quantity which exceeds the yield point thereof at the particular temperature. The maximum pressure contemplated is a pressure just below that which produces cracks or slip faults as already described. As in the case of the initial molding pressure, the determination of the pressure which will produce these defects in the hot quantity under given conditions of temperature, loading and article shape is a simple matter. Pressures which are suitable when the temperature is between 620° F. and 660° F. range from 1000 to 2000 pounds per square inch, gage. Pressures which are suitable when the temperature is between 660° F. and 700° F. range between 500 and 1500 pounds per square inch, gage.

With regard to the time during which a particular pressure is maintained on the hot quantity at a particular temperature in the present methods, the minimum time is that required to achieve transparency in all portions of the quantity. The amount of time required to realize this condition is dependent upon the particular temperature and pressure employed, the care taken in loading and the shape of the article. As a practical matter the determination of the time which will elapse in the case of each combination of these variables is not feasible. For example, the distribution of the mold charge during loading cannot be kept constant from case to case. The only practical test which has been discovered is the visual test, that is the inspection of each hot quantity from time to time during the application of pressure thereon, with the minimum time being understood to have elapsed when one inspection discloses that the portions of the quantity which appeared cloudy during the previous inspections have all become transparent. This is a very simple test, requiring no particular skill but merely the periodic opening of the mold or other means by which the pressure is applied. The distinction between portions of the quantity which are cloudy and those which are transparent is easily seen.

Because this test is so simple and requires so little effort it is preferred that it be applied to each piece treated by one of the present methods. It is understood, however, that those skilled in this art may develop sufficient duplication of conditions from one quantity to the next as to require application of the visual test only from time to time, for example at the beginning of each run. Similarly it will be appreciated that for some polytetrafluoroethylene articles it may be desirable to incorporate in each quantity of polytetrafluoroethylene amounts of other materials which do not substantially change the behavior of polytetrafluoroethylene in the present methods but which may color the quantity so as to prevent the use of the visual test thereon. In such a case it is understood that the determination as to when the minimum time has elapsed would be made from experience with pure quantities which are treated under the same conditions and inspected.

It is further understood that when a claim herein refers to the polytetrafluoroethylene being transparent this covers such material which does not in fact appear transparent because of coloring materials but which would appear transparent if not so colored.

The maximum time contemplated by this invention during which pressure is applied to the hot quantity is determined by the rate of decomposition of the polytetrafluoroethylene at the temperature selected. No particular advantage has been noted from continuing the pressure and temperature after achievement of complete transparency, and since decomposition works against the benefits derived from the invention, the maximum time is that after which the effects of decomposition more than offset these benefits. This maximum time will depend upon the temperature employed, the rates at which it was reached and cooled from and the extent of decomposition which may have occurred in the quantity during any previous treatment. Determination of the maximum time for each combination of these conditions is impractical, but for any particular conditions selected the employment of too long a time will be readily apparent from a strength test of the finished material for example, a tensile test. Then progressive shortening of the time with the same test in each case will quickly determine at what point the benefits of the invention are offset by the effects of decomposition.

With regard to the rate of cooling of the quantity which has been made transparent as contemplated by this invention this cooling rate may be as slow as is desired keeping in mind, however, that a slow rate of cooling, particularly from the higher temperatures, provides greater opportunity for decomposition. The rate of cooling may also be as rapid as is desired. In fact it is one discovery of the present invention that by far the best results are realized when the cooling is of the kind known in the art as shock cooling. Cooling rates which are suitable may be achieved by directly exposing the polytetrafluoroethylene while at a temperature above its second order transition temperature to a medium at a temperature ranging from 50° F. to —50° F.

One shock cooling technique which is preferred in this invention is the pressing of the hot, transparent quantity in a "cold" mold which is at a temperature in the neighborhood of 0° F. One advantage of this technique is that the pressure exerted on the piece by the mold (500 to 1500 pounds per square inch is a pressure range which has been found satisfactory) forces the hot quantity surfaces into very intimate contact with the cold mold surfaces, thus providing an excellent opportunity for maximum heat transfer. When such a cold mold is used for cooling its surfaces which engage the hot quantity should have the exact configurations of the finished article and have dimensions greater than such finished article by the amount of expansion which this material undergoes when heated as herein taught. Similarly in the case of the second mold the surfaces which engage the hot quantity should have the general configurations of the desired article and dimensions sufficiently larger than the final article dimensions to allow for expansion of the quantity from the heating.

One recognized difficulty with the cold mold technique is that the hot quantity in the second mold is difficult to remove therefrom for transfer to the cold mold without serious distortion. Accordingly, after the hot quantity has become properly transparent in the second mold it is preferred that this quantity be allowed to cool in the second mold to a temperature substantially below the second order transition temperature, for example, to approximately 500° F. At this latter temperature the quantity is readily removed from the second mold without harmful distortion. Inasmuch as the best results are obtained when the rapid cooling is from the temperature at which proper transparency was achieved, it is preferred to heat the quantity in an oven back to said temperature of transparency (from 500° F. or as the case may be) and hold said higher temperature (no pressure needed here) until the quantity again becomes transparent. Unlike the removal of the hot, transparent quantity from the second mold, removal of such quantity from the oven and the loading of it into the cold mold can be effected without harmful distortion of the quantity shape. This last transfer step should be done quickly, and preferably the hot quantity in the cold mold is properly transparent when the cold mold is closed under pressure.

Another shock cooling procedure which is satisfactory in the practice of the present methods involves immersion of the hot, transparent quantity in a fluid bath which is at a temperature substantially below the second order transition temperature. With this quenching procedure retention of the shape of the hot quantity during removal from the second mold and during immersion may be accomplished by the use of liners in the second mold which are interposed between the quantity and the mold surfaces and have their surfaces for engaging the hot quantity suitably shaped. In addition these liners are readily removable from the second mold. After the proper transparency is achieved in the hot quantity this quantity and the liners may be removed from the second mold as a sandwich and immersed in the cooling fluid as a unit. The use of these liners makes it unnecessary to cool the hot quantity to a temperature below the second order transition temperature before removal from the second mold, and, accordingly, the time required for this cooling and for the reheating back to the temperature of transparency is saved. Preferably the liners used are relatively thin, high heat conductive material, for example aluminum foil approximately twenty thousandths of an inch thick. Where it is desired to inspect the hot quantity to determine the extent of transparency and these liners are employed provision should be made for separating at least one liner from the hot quantity when the second mold is opened for the inspections. This can be accomplished by temporarily securing one liner to its part of the second mold prior to opening thereof.

Reference has been made earlier herein to the achievement of transparency in selective portions of a predetermined quantity of polytetrafluoroethylene rather than in all portions of the quantity, and it is understood that such achievement of transparency in selective portions, as for example by the application of different pressures on different portions of a predetermined quantity of this material, is within the scope of this invention. Similarly rapid cooling of selected portions of the hot, transparent quantity with remaining portions cooling more slowly is within the scope of this invention. Thus, in the case of quantities of polytetrafluoroethylene which are to be formed into articles of relatively large cross-section, shock cooling techniques of the kind herein described result in rapid cooling of the surface portions of the quantity whereas the center portions cool at a substantially slower rate. Accordingly, the surface portions of articles of such large cross-section will have the best properties and constitute a "skin" around the more central portions.

The following example illustrates a form in which the present invention has been employed to mold and treat a specific article, namely a polytetrafluoroethylene diaphragm valve diaphragm as shown in the accompanying drawings.

*Example 1*

Figure 2:
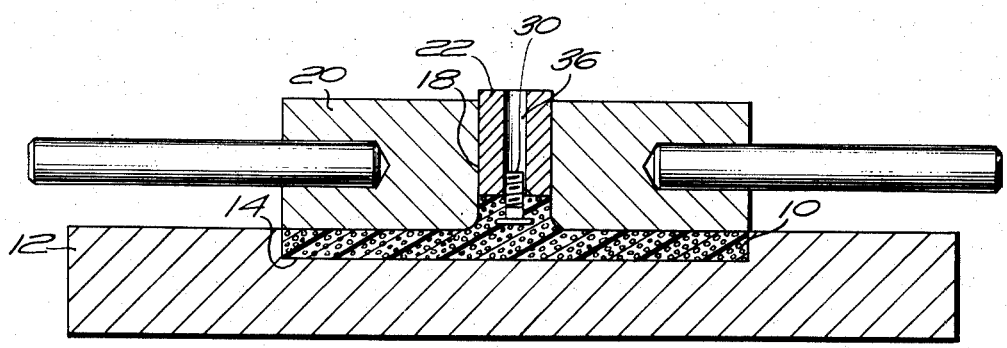
Figure 2 is a view like Figure 1, but showing the arrangement of the elements after loading of the preform mold is completed and before pressure is applied as set forth in example 1.

Sixty grams of "Teflon-1" 10 (a commercial polytetrafluoroethylene molding powder made by E. I. du Pont de Nemours & Company, Incorporated of Wilmington, Delaware, and referred to on page 4 of pamphlet A–6251 of that company entitled "Du Pont Teflon Tetrafluoroethylene Resin") at room temperature were loaded into the lower part 12 of a preform mold and evenly distributed throughout the preform mold cavity 14. This cavity 14 had the configuration of a flat circular wafer with a central cylindrical extension 16 from one side thereof defined by a passage 18 in the upper mold part 20 and by a plug member 22 in this passage. In the finished diaphragm this central extension provided a hub 24 (see Fig. 9) in which the head 26 of a stud 28 was embedded. The threaded shank 30 of the stud 28 extended out of this hub. To properly locate this stud in the preform piece the major portion of the sixty grams of molding powder was first placed in the lower mold part 12 and evenly distributed therein. Next the upper mold part 20 was rested on this portion of the powder and a portion of the remainder of the sixty grams was poured into the open upper end 32 of the upper mold part passage 18 and distributed evenly at the lower end 34 of this passage as shown in Fig. 1. Next the stud 28 was rested on its head 26 on the powder at the lower end 34 of the passage 18 as shown in Fig. 1 and the remainder of the sixty grams was poured into the passage 18 to cover the stud head 26 as shown in Fig. 2. Then the plug member 22 was placed in the passage 18 to rest on the powder as shown in Fig. 2. This plug member fitted snugly into the passage 18 and was provided with its own central passage 36 to accommodate the stud shank 30 extending from the powder.

Figure 3:
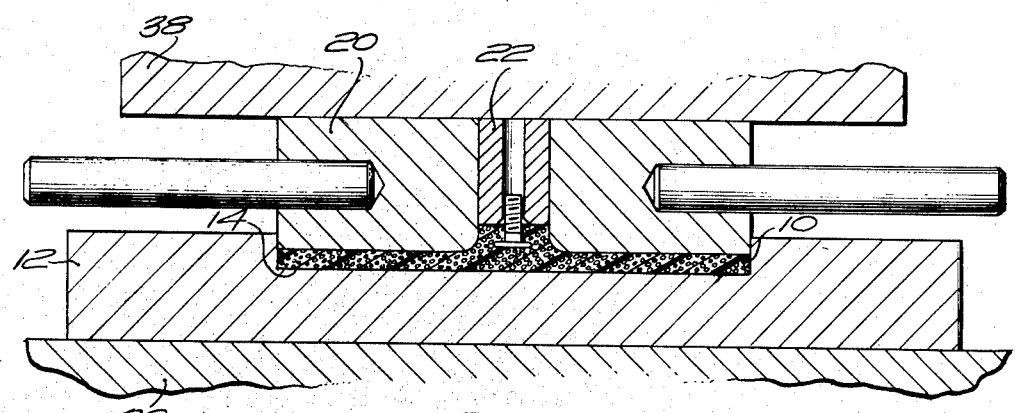
Figure 3 is a view like Figure 2, but showing the arrangement after the preform pressure is applied as set forth in Example 1.

Preform molding pressure of 1500 pounds per square inch was then exerted on the molding powder by a press 38 as shown in Fig. 3, for a period of thirty seconds while the powder 10 was at substantially room temperature. Upon release of this pressure at the end of the thirty seconds the preform piece was removed from the preform mold and was found to have form of the preform mold cavity 14 with a thickness slightly greater than that desired in the finished diaphragm. At this point the preform piece was white and substantially opaque.

Figure 4:
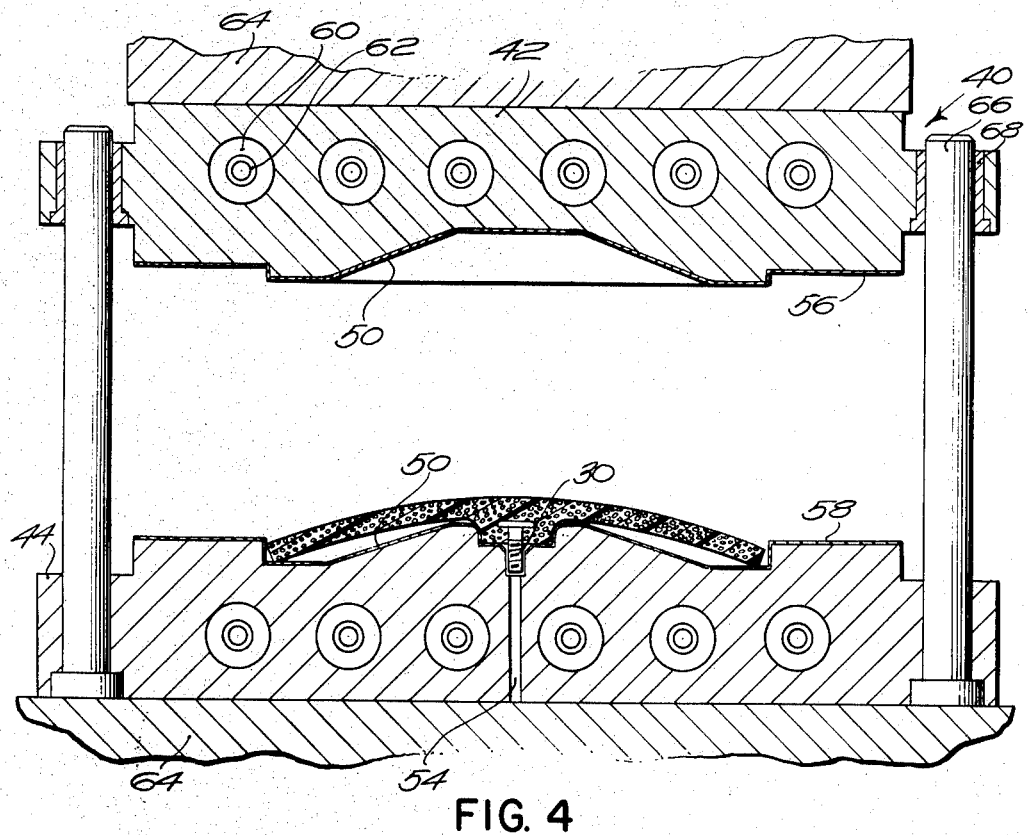
Figure 4 is a cross-section elevation view of the second mold with the hot preform piece theerin at that stage in the method set forth in Example 1 just prior to exerting pressure on the hot preform piece in the second mold.
Figure 5:
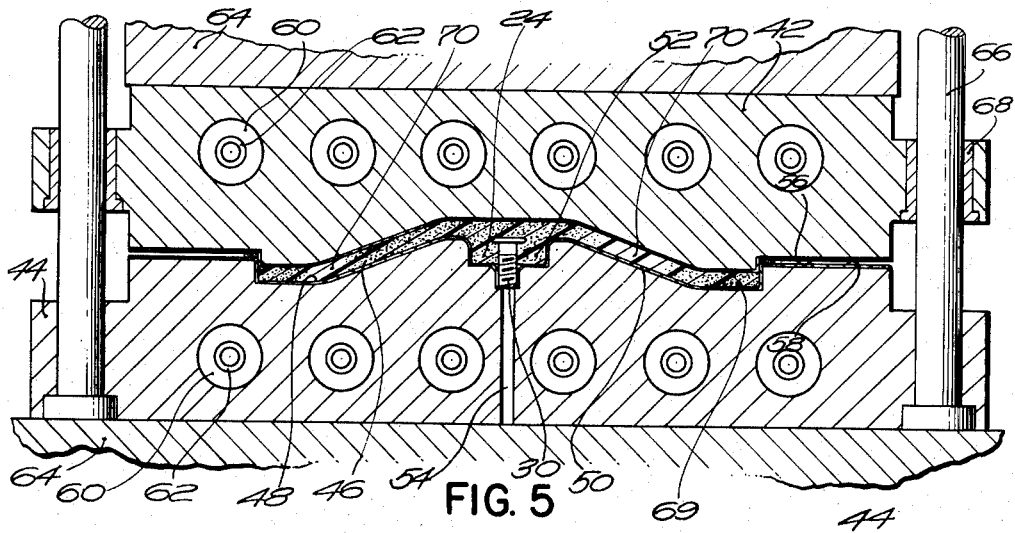
Figure 5 is a view like Figure 4, but showing the arrangement with the second mold pressure applied and after this pressure has been applied long enough to produce transparency in some portions of the diaphragm as described in Example 1.

This preform piece was then placed in an open oven and heated to a temperature of 680° F. (above the second order transition temperature of polytetrafluoroethylene which is approximately 620° F. at atmospheric pressure) and held at this temperature for thirty minutes. At the end of this latter period the heated preform piece, while still at approximately 680° F., was transferred to a second mold 40 which was itself heated to approximately 680° F. At this point the hot preform piece was still white and opaque and assumed the configuration as shown in Fig. 4. The upper and lower parts 42 and 44 of this mold 40 were adapted to form, when brought together as shown in Fig. 5, a cavity 46 having the general configuration of the desired finished diaphragm but having dimensions greater than the dimensions of such diaphragm by the amount of expansion of the material at the temperature employed (680° F.). The cavity surfaces 48 of the second mold parts were chrome plated, as indicated at 50, to prevent corrosion of the mold parts.

The lower mold part 44 was provided with a recess 52 to accommodate the hub 24 on the preform piece and with a central passage 54 communicating with this recess to accommodate the stud shank 30 extending from this hub. No stops were employed to limit the distance separating the mold parts, the amount of material in the preform piece being sufficient to produce a slight flashing when pressure was applied as described hereafter and prevent contact of the respective upper and lower mold part outer surfaces 56 and 58 as shown in Fig. 5. Passages 60 in the mold parts were adapted to contain heating elements 62 for raising the mold to the approximate 680° F. and for maintaining this temperature. The mold parts were secured in a press 64 in the well known way and maintained in proper alignment by aligning pins 66 and guides 68 therefor.

Figure 6:
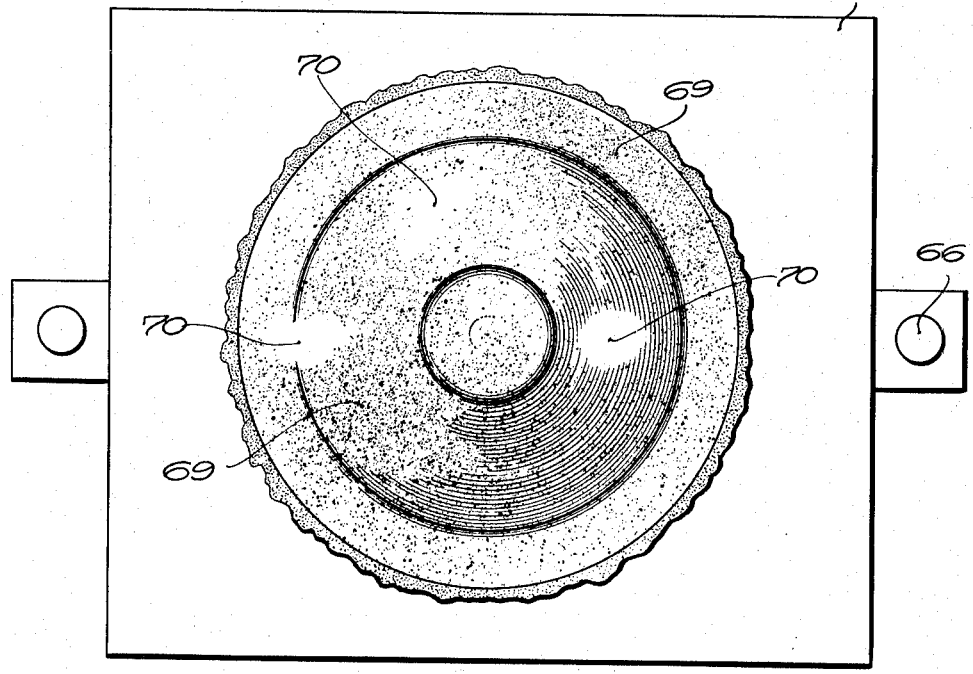
Figure 6 is a plan view of the lower part of the second mold and diaphragm therein after the second mold has been opened for one of the periodic inspections set forth in Example 1, transparency in some portions being indicated as in Figure 5.
Figure 7:
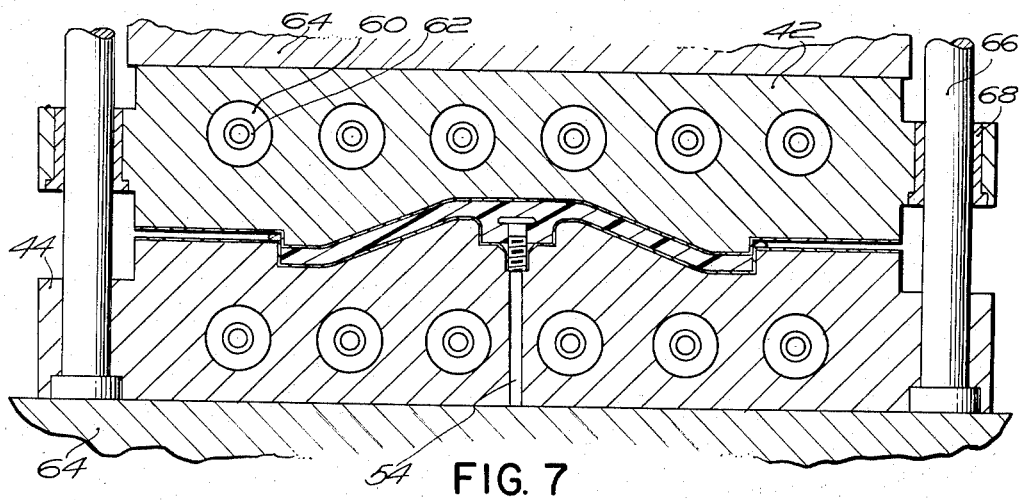
Figure 7 is a view like Figure 5, but showing the entire diaphragm transparent as set forth in Example 1.

After insertion of the hot preform piece into the second mold, as described, the mold parts were closed and molding pressure of approximately 1000 pounds per square inch was exerted on the hot preform piece with the temperature maintained at approximately 680° F. This pressure and temperature were then continued for approximately thirty minutes with periodic releasing of the pressure and opening of the second mold to inspect the piece approximately every five minutes. The periodic inspection at the end of approximately fifteen minutes revealed that the piece had become transparent in all of its parts as represented in Fig. 7 of the drawings by the absence of dots. In Fig. 6 the cloudy appearance of the major portions of the formed piece during one of the earlier inspections is represented by the dotted areas 69 with random transparent portions represented by the dot-free areas 70.

After noting the continuous transparency shown in Fig. 7 the second mold was again closed, and while the same pressure was exerted on the formed piece, the temperature of the formed piece was reduced to approximately 500° F. by lowering the temperature of the mold parts to approximately this temperature.

Next the second mold was again opened and the piece then at approximately 500° F. (below second order transition temperature of polytetrafluoroethylene) was seen to have a continuous cloudy appearance as distinguished from the transparent appearance noted earlier at the temperature of approximately 680° F. The formed cloudy piece was then removed from the second mold and placed in an oven at atmospheric pressure and reheated to a temperature of approximately 700° F. and held at this temperature until the formed piece again appeared entirely transparent, this occurring after about twenty minutes of this reheating.

Figure 8:
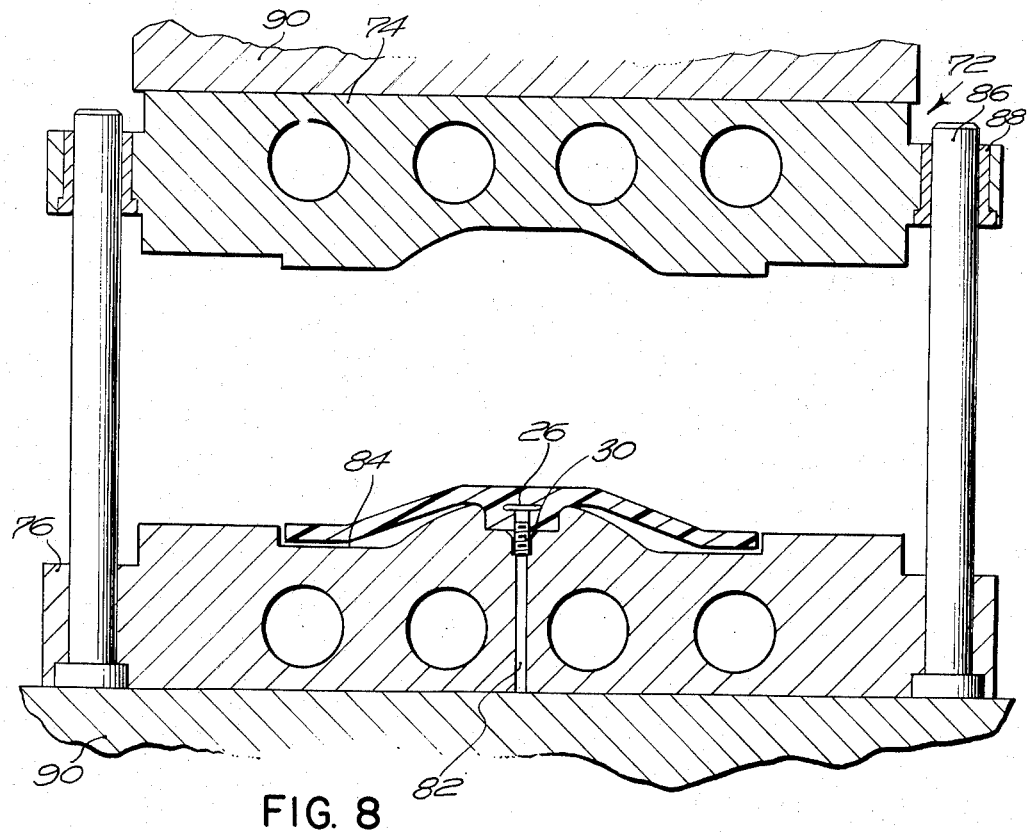
Figure 8 is a cross-section elevation view of the open cold mold and hot transparent diaphragm inserted therein preparatory to closing this cold mold as set forth in Example 1.
Figure 9:
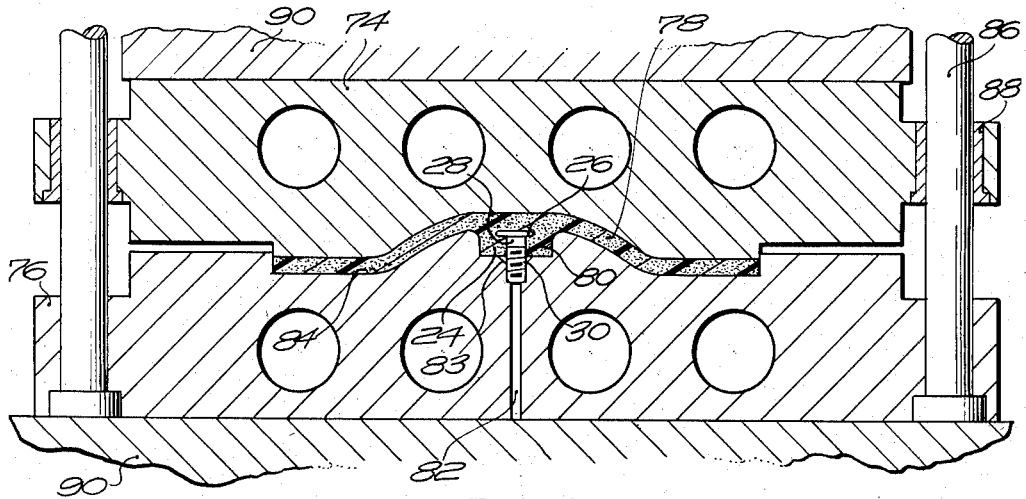
Figure 9 is a view like Figure 8 but showing the cold mold closed and exerting pressure on the diaphragm. The diaphragm is shown cooled, as set forth in Example 1.

Then the hot piece was quickly placed in a cold mold 72 as shown in Fig. 8. This cold mold had upper and lower mold parts 74 and 76 which when brought together as shown in Fig. 9 defined a cavity 78 having the exact configurations of the finished diaphragm but having dimensions greater than those of the finished diaphragm by the amount of expansion of this material at the temperature of the reheated piece. As in the case of the second mold, the cold mold 72 had its lower part 76 provided with a recess 80 to accommodate the diaphragm hub 24 and with a passage 82 communicating centrally with this recess to receive the stud shank 30 projecting from this hub. The slight bevel 83 at the juncture of recess 80 and passage 82 permitted quick location of the reheated formed piece on the lower cold mold part 76. In addition the cold mold parts were of steel with their cavity surfaces chrome plated as at 84 to achieve a smooth finish on the diaphragm. Suitable aligning pins 86 were employed and guides 88 which received the same. The temperature of the cold mold was 0° F. when the reheated formed piece was inserted therein, this low temperature being achieved by packing the cold mold parts in Dry Ice prior to such insertion.

Immediately after the reheated formed piece was properly located on the lower cold mold part 76, the cold mold parts were closed by a press 90 and a pressure of approximately 1500 pounds per square inch was exerted on the piece. By accomplishing the transfer of the reheated piece from the oven to the cold mold quickly the cold mold was closed while the reheated piece was still entirely transparent. After approximately sixty seconds of the application of the pressure described the cold mold was opened and the finished diaphragm was removed.

On tests polytetrafluoroethylene diaphragms made by this method were found to have flex life about five times greater than the flex life of diaphragms of this material made by methods previously known.

Example 2

The same steps were followed as in Example 1 except that the hot piece was intentionally allowed to cool in the second mold to approximately 500° F. before the piece had become entirely transparent (See Figs. 5 and 6). Then the steps were continued as in Example 1 except that the piece did not become entirely transparent upon reheating and was removed from the oven when it achieved its maximum transparency, that is, the same degree of transparency achieved in the second mold.

On tests diaphragms made by this procedure were found to have substantially the same flex life as had been observed in diaphragms made by the previously known methods (about one-fifth that of Example 1).

Example 3

Figure 10:
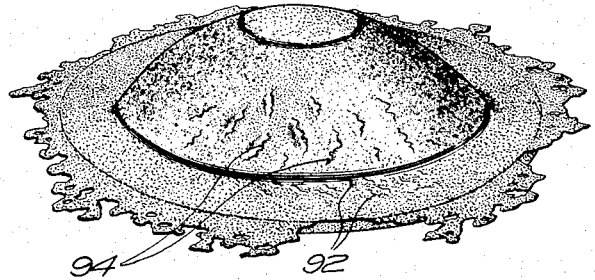
Figure 10 is a three dimensional view of a diaphragm which was made in accordance with the method of Example 3.

The same steps were followed as in Example 1 except that the pressure exerted by the second mold was 10,000 pounds per square inch. Cracks and slip faults were produced and complete transparency was impossible to attain because of these cracks and slip faults. Fig. 10 is a representation of the appearance of these defects in the finished diaphragm. Cracks are indicated at 92, slip faults at 94.

On test diaphragms made by this procedure were found to be completely unsatisfactory, many having such cracks that mere manual bending of the diaphragms revealed holes passing completely therethrough.

Example 4

The same steps were followed as in Example 1 except that the preform piece was heated in the oven to approximately 750° F. and left at temperature for about two hours before insertion in the second mold.

On test diaphragms made by this procedure were found to have less strength due to decomposition than diaphragms made by the previously known methods.

I claim:

1. The method of treating a predetermined quantity of polytetrafluoroethylene which comprises applying to said quantity, while said quantity is within a temperature range defined by the second order transition temperature of said polytetrafluoroethylene and a higher maximum temperature, superatmospheric pressure at least until all portions of said quantity become substantially transparent by observation while said quantity is at a temperature of at least the second order transition temperature but for an insufficient time to produce substantial decomposition of said polytetrafluoroethylene, and cooling said quantity through said transition temperature, said maximum temperature being less than that temperature which produces substantial decomposition of said polytetrafluoroethylene during the period that said quantity is within said temperature range.

2. The method of claim 1 wherein said maximum temperature is 850° F.

3. The method of claim 1 wherein said quantity is molded into a predetermined shape by said application of said superatmospheric pressure.

4. The method of treating a predetermined quantity of polytetrafluoroethylene particles to obtain a finished article intended to be flexed which comprises placing said quantity of polytetrafluoroethylene particles in a preforming die, compressing said quantity in said die into a preform of predetermined shape, removing said preform from said preforming die, placing said preform in a second die of a different shape than said first die, applying to said preform in said second die and while said preform is within a temperature range defined by the second order transition temperature of said polytetrafluoroethylene and a higher maximum temperature, superatmospheric pressure at least until all portions of said preform, which are present in the part of the finished article intended to be flexed, become substantially transparent by observation while said preform is at a temperature of at least the second order transition temperature but for an insufficient time to produce substantial decomposition of said polytetrafluoroethylene, and cooling said treated preform through said transition temperature, said superatmospheric pressure being insufficient to produce substantial cracks in said hot preform and said maximum temperature being less than that temperature which produces substantial decomposition of said polytetrafluoroethylene during the period that said preform is within said temperature range.

5. The method of claim 4 wherein said preform is heated above the second order transition temperature after it is formed in said preforming die and before it is placed in said second die.

6. The method of claim 4 wherein said maximum temperature is 750° F. and wherein said cooling is a shock cooling.

7. The method of claim 4 wherein said cooling step comprises placing said treated preform, while above said second order transition temperature, in a third die at a temperature below said second order transition temperature and applying pressure thereto in said die to cool the treated preform and produce the said finished article.

8. The method of treating a predetermined quantity of substantially pure polytetrafluoroethylene which comprises the steps of heating said quantity to a temperature between the second order transition temperature of said polytetrafluoroethylene and a higher temperature, exerting first pressure on the article in a first pressure exerting device, said first pressure being insufficient to produce cracks in said heated quantity, simultaneously maintaining said heating and said first pressure at least until all portions of the quantity which are cloudy become transparent by observation while said quantity is at a temperature above the second order transition temperature but for an insufficient time to produce substantial decomposition of said polytetrafluoroethylene, cooling said quantity to a temperature substantially below said transition temperature, removing the cooled quantity from said first pressure exerting device, reheating the cooled quantity to a temperature between said transition temperature and 750° F. at least until all cloudy portions of said quantity again become transparent but for an insufficient time to produce said substantial decomposition, and suddenly exerting second pressure on the reheated, transparent quantity in a second pressure exerting device having a temperature substantially below said transition temperature to shock cool the quantity through said transition temperature.

9. The method of treating a predetermined quantity of polytetrafluoroethylene which comprises the steps of heating said quantity to a temperature within a range defined by the second order transition temperature of said polytetrafluoroethylene and a higher temperature, confining said heated quantity in a pressure exerting device having its surfaces which surround said quantity faced with liners, said liners having their surfaces which engage said quantity defining the desired shape of said quantity and said liners being removable from said device, exerting pressure on the heated quantity, said pressure being insufficient to produce cracks in the heated quantity, maintaining said heating and said pressure at least until all cloudy portions of said quantity become transparent by observation while said quantity is at a temperature of at least the second order transition temperature but for an insufficient time to produce substantial decomposition of said polytetrafluoroethylene, releasing said pressure, removing from said device the transparent quantity and the liners as a unit, and suddenly immersing said unit in a fluid which is at a temperature substantially below said transition temperature to shock cool said quantity through said transition temperature.

10. A polytetrafluoroethylene article which has been pressure formed in a mould and which is by observation substantially transparent in substantially all of its portions when heated to a temperature between the second order transition temperature of this material and 850° F. and which is translucent at room temperature.

11. A polytetrafluoroethylene diaphragm which, by observation is substantially transparent in substantially all of its portions which are flexed during use when said diaphragm is heated to a temperature of at least the second order transition temperature.

12. The method of treating a polytetrafluoroethylene diaphragm valve diaphragm which comprises the steps of heating said diaphragm to within a temperature range defined by the second order transition temperature of said polytetrafluoroethylene and 700° F., maintaining the temperature of said hot diaphragm within said range for between one half hour and two hours, exerting on the hot diaphragm pressure of between 500 and 2000 pounds per square inch, gage, maintaining said heating and said pressure at least until substantially all portions of said hot diaphragm become substantially transparent by observation while said quantity is at a temperature of at least the second order transition temperature, and shock cooling said hot, substantially transparent diaphragm through said transition temperature.

13. The method of simultaneously molding and treating a polytetrafluoroethylene diaphragm valve diaphragm which comprises the steps of loading a predetermined quantity of polytetrafluoroethylene molding powder into a preform mold having a cavity with at least the general configurations of said diaphragm, applying to said powder in said preform mold pressure of between 1000 and 3000 pounds per square inch, gage to form the powder into a preform piece, releasing said preform mold pressure and removing the preform piece from the preform mold, heating said preform piece to within a temperature range defined by the second order transition temperature of said polytetrafluoroethylene and 700° F. maintaining the temperature of said preform piece within said range for between one half hour and two hours, loading said hot preform piece into a second mold which has a cavity with at least the general configurations of said diaphragm and which is heated to a temperature of the same order as the temperature of said hot preform piece, applying to said hot preform piece in said second mold pressure of between 500 and 2000 pounds per square inch, gage, maintaining said second mold pressure and temperature at least until said hot piece is both formed to the configurations of the second mold cavity and substantially all portions of said piece have become substantially transparent by observation while said quantity is at a temperature of at least the second order transition temperature, and shock cooling said hot, substantially transparent piece through said transition temperature.

14. The method of claim 7 wherein said cooling step comprises cooling said treated preform to a temperature below the second order transition temperature and thereafter heating it to a temperature of at least said second order transition temperature before placing it in said third die.

15. The method of claim 1 wherein said superatmospheric pressure is between 500 p. s. i. and a higher maximum pressure which is insufficient to produce substantial cracks in said hot quantity.

16. The method of treating a predetermined quantity of polytetrafluoroethylene to form an article intended to be flexed, which comprises applying to said quantity, while said quantity is within a temperature range defined by the second order transition temperature of said polytetrafluoroethylene and a higher maximum temperature, superatmospheric pressure at least until all portions of said quantity which are intended to be flexed become substantially transparent by observation while said quantity is at a temperature of at least the second order transition temperature but for an insufficient time to produce substantial decomposition of said polytetrafluoroethylene, and cooling said quantity through said transition temperature, said maximum temperature being less than that temperature which produces substantial decomposition of said polytetrafluoroethylene during the period that said quantity is within said temperature range.

References Cited in the file of this patent

UNITED STATES PATENTS

| | | |
|---|---|---|
| 2,456,262 | Fields | Dec. 14, 1948 |
| 2,559,750 | Berry | July 10, 1951 |
| 2,602,962 | Deakin | July 15, 1952 |
| 2,617,149 | Rubin | Nov. 11, 1952 |
| 2,710,991 | Squires et al | June 21, 1955 |
| 2,728,698 | Rudner | Dec. 27, 1955 |